United States Patent [19]

Lewis et al.

[11] Patent Number: 4,599,517
[45] Date of Patent: Jul. 8, 1986

[54] DISPOSABLE RABBIT

[75] Inventors: Leroy C. Lewis, Idaho Falls; David R. Trammell, Rigby, both of Id.

[73] Assignee: The United States of America as represented by the United States Department of Energy, Washington, D.C.

[21] Appl. No.: 541,186

[22] Filed: Oct. 12, 1983

[51] Int. Cl.⁴ .................................................. G21F 5/00
[52] U.S. Cl. ................................................. 250/506.1
[58] Field of Search ................ 250/506.1, 507.1; 252/633

[56] References Cited

U.S. PATENT DOCUMENTS

| | | | |
|---|---|---|---|
| 3,926,176 | 12/1975 | Winchell et al. | 250/506.1 |
| 4,230,597 | 10/1980 | Bustard et al. | 252/633 |

FOREIGN PATENT DOCUMENTS

| | | | |
|---|---|---|---|
| 2741661 | 3/1979 | Fed. Rep. of Germany ... | 250/506.1 |
| 2493583 | 5/1982 | France .............................. | 250/506.1 |
| 196198 | 12/1982 | Japan ................................ | 252/633 |

*Primary Examiner*—Bruce C. Anderson
*Attorney, Agent, or Firm*—Jeannette M. Walder; John M. Albrecht; Judson R. Hightower

[57] ABSTRACT

A disposable rabbit for transferring radioactive samples in a pneumatic transfer system comprises aerated plastic shaped in such a manner as to hold a radioactive sample and aerated such that dissolution of the rabbit in a solvent followed by evaporation of the solid yields solid waste material having a volume significantly smaller than the original volume of the rabbit.

5 Claims, 4 Drawing Figures

DISPOSABLE RABBIT

CONTRACTUAL ORIGIN OF THE INVENTION

The U.S. Government has rights in this invention pursuant to Contract No. DE-AC07-79ID01675 between the U.S. Department of Energy and Exxon Nuclear Idaho Company, Inc.

BACKGROUND OF THE INVENTION

This invention relates to the field of nuclear waste mangagement, and more particularly, to a disposable rabbit for use in pneumatic transfer systems.

A rabbit is a small container which is usually moved pneumatically for transferring radioactive samples (usually contained in a septum bottle) in an atomic energy plant or laboratory. Present rabbits are made of high density polyethylene which is difficult to compact. The polyethylene rabbits are fairly expensive initially and may require decontamination between uses. Since decontamination is not always effective, there is the possiblity of sample contamination and erroneous analytical results with the reuseable rabbits. In a plant using a large number of rabbits, disposal of contaminated non-reuseable rabbits presents a significant waste management problem due to the very large cost associated with that operation.

The polyethylene rabbits have a fixed opening to receive the sample bottles and require additional packing material to prevent movement of the sample bottle during a transfer. After use, the packing material must be carefully removed so as not to damage the sample and becomes additional solid waste for disposal. The polethylene rabbit also has a friction lid which requires a special tool for removal.

Therefore, it is an object of the present invention to provide a rabbit that can be disposed of without the need for compaction.

It is a further object of the present invention to provide a rabbit that can be used once and discarded with a significant reduction in waste disposal costs and efforts.

It is yet another object of the present invention to provide a rabbit that will safely hold a sample without additional packing material and requires no special tools for removal of the sample.

It is also an object of the present invention to provide a method of managing the transfer of radioactive samples in a manner that minimizes the amount of nuclear waste.

Additional objects, advantages and novel features of the invention will be set forth in part in the description which follows, and in part will become apparent to those skilled in the art upon examination of the following or may be learned by practice of the invention.

SUMMARY OF THE INVENTION

To achieve the foregoing and in accordance with the purposes of the present invention, a rabbit for transferring radioactiave samples may comprise aerated plastic shaped in such a manner as to hold a radioactive sample and aerated such that dissolution of the rabbit in a solvent followed by evaporation of the solvent yields solid waste material having a volume significantly smaller than the original volume of the rabbit. This resultant small volume of waste material can be disposed of without compaction at signficant cost savings. It should also be noted that less volume of solid waste presents less hazard to personnel working in the plant or laboratory. Since radioactive samples are generally contained in special septum sealed bottles, the rabbit is shaped to hold the bottle without additional packing material to prevent movement or damage to the sample bottle during a transfer.

A method of managing (i.e. in the sense of nuclear waste management) the transfer of radioactive samples may comprise the steps of (1) placing a radioactive sample in the rabbit described above; (2) transferring the rabbit and sample to a desired location; (3) removing the sample from the rabbit; and (4) disposing of the rabbit. Disposal may include the steps of dissolving the rabbit in a solvent followed by evaporating the solvent. A very small amount of residue results, which is much easier to dispose of than prior rabbits. The disposable rabbits may be transferred by hand or in an automated transfer system. Such systems are generally pneumatic.

DESCRIPTION OF THE DRAWINGS

The present invention is illustrated in the accompanying drawings wherein.

DESCRIPTION OF A PREFERRED EMBODIMENT

A rabbit for transferring radioactive samples in accordance with the present invention is formed of an aerated plastic. Preferably the plastic is polystyrene, which is easily shaped. The polystyrene must be shaped to hold the radioactive sample securely and, if used on a pneumatic transfer system, must be shaped to travel smoothly in the system. In order to achieve the purposes of the present invention the polystyrene must be aerated sufficiently so that a lightweight, multicelluar solid is formed. The rabbit must also be rigid enough to support and transport the sample without damage to the sample. The polystyrene should be aerated sufficiently so that dissolution of the rabbit in a solvent followed by evaporation of the solvent yields a waste material having a significantly smaller volume than the original rabbit. The fact that the large rabbit volume can be reduced to a very small waste product permits great savings in the management of nuclear waste. Not only is the volume of solid waste which must be disposed greatly reduced, but hazards to personnel are lessened, and most importantly, the rabbits can be used once and discarded—thereby eliminating intermediate decontamination steps entirely.

Figure 1A:
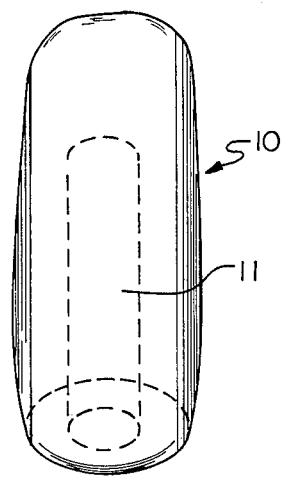
FIGS. 1A–1D are suggested shapes for a disposable rabbit.
Figure 1B:
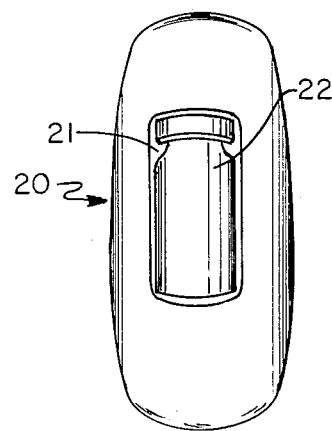
Figure 1C:
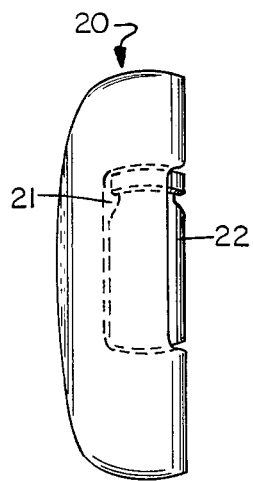
Figure 1D:
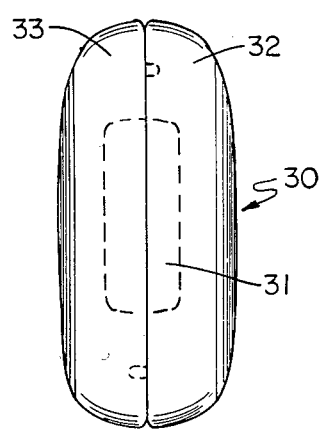

A readily available, extremely inexpensive, aerated polystyrene is known as styrofoam TM. Styrofoam rabbits were made in accordance with the shapes shown in FIGS. 1A–1D. In FIG. 1A, rabbit 10 was formed of solid styrofoam TM. An opening 11 was drilled in the center of rabbit 10, which was sized to receive the septum-sealed bottles used to take and carry the radioactive samples. A septum bottle 22 is shown in FIG. 1B. The rabbit is shaped essentially as a cylindrical solid with rounded ends. This shape permits easy passage in a pneumatic transfer system. In FIG. 1B rabbit 20 has side opening 21 for receiving sample bottle 22. Rabbit 20 is also shaped as a rounded cylindrical solid. The side opening 21 must be deep enough to receive bottle 22 without increasing the overall size of the rabbit as shown in FIG. 1C. The openings 11 and 21 in the styrofoam TM rabbits were sized to permit a relatively tight fit so that no additional packing is needed to support a sample bottle. FIG. 1D shows a smooth cylindrically shaped rabbit 30 consisting of interlocking halves 32 and 33 forming opening 31 for receiving a sample bottle.

The disposable rabbits are used essentially in the following manner. A septum-sealed bottle containing a radioactive sample is placed in a disposable rabbit. The opening in the rabbit has been sized to permit a snug fit. No additional packing material is required. The rabbit with sample bottle is transferred pneumatically to a desired location. After transfer, the sample bottle is removed. This is easily accomplished by cutting open the rabbit of FIG. 1A or 1B with a knife or other available tool. If the rabbit was sized as two interlocking halves as in FIG. 1D, no tool would be necessary. However, since the rabbit may be used once and destroyed, no care need be taken in order to reuse the rabbit. Disposable rabbits made of commercially available styrofoam TM are very inexpensive and result in even greater cost savings in a nuclear plant or laboratory.

EXAMPLE

A solid 260 cm$^3$ block of styrofoam TM was dissolved in a hot cell in approximately 5 cm$^3$ of acetone. The resultant residue volume was 10 cm$^3$ and had a density approximately that of water (1.0 gm/cm$^3$). Evaporation of the acetone yielded a volume approximately 4% of the original volume.

In this disclosure there is shown and described only the preferred embodiments of the invention, but is is to be understood that the invention is capable of use in other combinations.

The embodiments of this invention in which an exclusive property or provilege is claimed are defined as follows:

1. A method of managing the transfer of a sealed vessel containing a radioactive sample comprising the steps of:
    placing a sealed vessel containing a radioactive sample in an opening in a disposable rabbit formed of solid aerated plastic which opening has been sized to receive and snuggly hold said vessel without additional packing material to prevent damage to said vessel during transfer and to permit removal of such vessel intact from the rabbit following transfer and said aerated plastic aerated such that dissolution of said rabbit in a solvent followed by evaporation of said solvent yields solid waste material having a significantly smaller volume than the original volume of said rabbit;
    transferring said rabbit and said vessel to a desired location;
    removing said vessel intact from said rabbit; and disposing of said rabbit.
2. The method of claim 1 wherein said disposing step includes the steps of:
    dissolving said rabbit in a solvent; and
    evaporating said solvent.
3. The method of claim 2 wherein said plastic is polystyrene and said solvent is acetone.
4. The method of claim 1 wherein said transfer is pneumatic.
5. The method of claim 1 wherein said radioactive sample is contained in a septum sealed bottle.

* * * * *